US009286548B2

(12) United States Patent
Kannan et al.

(10) Patent No.: US 9,286,548 B2
(45) Date of Patent: Mar. 15, 2016

(54) ACCURATE TEXT CLASSIFICATION THROUGH SELECTIVE USE OF IMAGE DATA

(71) Applicant: MICROSOFT TECHNOLOGY LICENSING, LLC, Redmond, WA (US)

(72) Inventors: Anitha Kannan, Mountain View, CA (US); Partha Pratim Talukdar, Pittsburgh, PA (US); Nikhil Rasiwasia, La Jolla, CA (US); Qifa Ke, Cupertino, CA (US); Rakesh Agrawal, San Jose, CA (US)

(73) Assignee: Microsoft Technology Licensing, Redmond, WA (US)

( * ) Notice: Subject to any disclaimer, the term of this patent is extended or adjusted under 35 U.S.C. 154(b) by 0 days.

(21) Appl. No.: 14/292,294

(22) Filed: May 30, 2014

(65) Prior Publication Data
US 2014/0270497 A1    Sep. 18, 2014

Related U.S. Application Data

(63) Continuation of application No. 13/158,484, filed on Jun. 13, 2011, now Pat. No. 8,768,050.

(51) Int. Cl.
*G06K 9/62*    (2006.01)
(52) U.S. Cl.
CPC ............ *G06K 9/6268* (2013.01); *G06K 9/6227* (2013.01); *G06K 9/6293* (2013.01)
(58) Field of Classification Search
CPC .. G06K 9/6268; G06K 9/6293; G06K 9/6227
USPC ........... 382/161; 707/728, 732, 736, 748, 769
See application file for complete search history.

(56) References Cited

U.S. PATENT DOCUMENTS 7,039,856 B2    5/2006  Peairs et al.
7,809,192 B2 *  10/2010 Gokturk ............ G06F 17/30253
                                                382/176

(Continued)

OTHER PUBLICATIONS

Ahmed, et al., "Structured Literature Image Finder: Parsing Text and Figures in Biomedical Literature", Retrieved at <<http://www.cs.cmu.edu/~wcohen/postscript/jws-2010.pdf>>, In Web Semantics: Science, Services and Agents on the World Wide Web, Mar. 30, 2010, pp. 1-8.

(Continued)

*Primary Examiner* — Gregory M Desire
(74) *Attorney, Agent, or Firm* — Sandy Swain; Micky Minhas

(57) ABSTRACT

Product images are used in conjunction with textual descriptions to improve classifications of product offerings. By combining cues from both text and image descriptions associated with products, implementations enhance both the precision and recall of product description classifications within the context of web-based commerce search. Several implementations are directed to improving those areas where text-only approaches are most unreliable. For example, several implementations use image signals to complement text classifiers and improve overall product classification in situations where brief textual product descriptions use vocabulary that overlaps with multiple diverse categories. Other implementations are directed to using text and images "training sets" to improve automated classifiers including text-only classifiers. Certain implementations are also directed to learning a number of three-way image classifiers focused only on "confusing categories" of the text signals to improve upon those specific areas where text-only classification is weakest.

20 Claims, 4 Drawing Sheets

(56) References Cited

U.S. PATENT DOCUMENTS

| | | | | |
|---|---|---|---|---|
| 7,836,060 | B1* | 11/2010 | Rennison | G06F 17/30675 707/749 |
| 8,433,140 | B2* | 4/2013 | Ke et al. | 382/209 |
| 8,478,052 | B1* | 7/2013 | Yee et al. | 382/224 |
| 8,713,007 | B1* | 4/2014 | Korolev et al. | 707/729 |
| 2004/0117395 | A1* | 6/2004 | Gong | G06N 5/04 |
| 2011/0004588 | A1* | 1/2011 | Leitersdorf | G06F 17/30864 707/711 |
| 2012/0123863 | A1* | 5/2012 | Kaul | G06Q 30/0254 705/14.52 |
| 2012/0243789 | A1* | 9/2012 | Yang | G06K 9/4676 382/195 |
| 2013/0173419 | A1* | 7/2013 | Farber | G06Q 30/0631 705/26.7 |
| 2014/0108376 | A1* | 4/2014 | Batali et al. | 707/708 |

OTHER PUBLICATIONS

Tollari, et al., "Enhancement of Textual Images Classification using their Global and Local Visual Contents", Retrieved at <<http://www-lsr.imag.fr/MAWIS03/PDF/paper6.pdf>>, Proceedings of the 1st International Workshop on Metadata and Adaptability in Web-Based Information Systems (MAWIS), (In conjunction with 9th International Conference on Object-Oriented Information Systems), Sep. 2003, pp. 13.
Dong, Shou-Bin., "The Hierarchical Classification of Web Content by the Combination of Textual and Visual Features", Retrieved at <<http://ieeexplore.ieee.org/stamp/stamp.jsp?arnumber=01382015>>, Proceedings of the Third International Conference on Machine Learning and Cybernetics, Aug. 26-29, 2004, pp. 1524-1529.
Sclaroff, et al., "Unifying Textual and Visual Cues for Content-Based Image Retrieval on the World Wide Web", Retrieved at <<http://citeseerx.ist.psu.edu/viewdoc/download?doi=10.1.1.102.2503&rep=rep1&type=pdf>>, Computer Vision and Image Understanding—Special issue on content-based access for image and video libraries, vol. 75, No. 1-2, Jul.-Aug. 1999, pp. 86-98.
Tollari, et al., "Enhancement of Textual Images Classification using Segmented Visual Contents for Image Search Engine", Retrieved at <<http://citeseerx.ist.psu.edu/viewdoc/download?doi=10.1.1.100.1578&rep=rep1&type=pdf>>, Apr. 29, 2005, pp. 1-12.
Hammami, et al., "WebGuard: A Web Filtering Engine Combining Textual, Structural, and Visual Content-Based Analysis", Retrieved at <<http://ieeexplore.ieee.org/stamp/stamp.jsp?tp=&arnumber=1563988>>, IEEE Transactions on Knowledge and Data Engineering, vol. 18, No. 2, Feb. 2006, pp. 272-284.
Shatkay, et al., "Integrating image data into biomedical text categorization", Retrieved at <<http://bioinformatics.oxfordjournals.org/content/22/14/e446.full.pdf>>, Bioinformatics, vol. 22, No. 14, Jul. 2006, pp. e446-e453.
Schonfeld, Erick., "Forrester Forecast: Online Retail Sales will grow to $250 Billion by 2014", Retrieved at <<http://techcrunch.com/2010/03/08/forrester-forecast-online-retail-sales-will-grow-to-250-billion-by-2014/>>, Mar. 8, 2010, pp. 9.
"Global Trends in Online Shopping: A Nielsen Global Consumer Report", Retrieved at <<http://hk.nielsen.com/documents/Q12010OnlineShoppingTrendsReport.pdf>>, Jun. 2010, pp. 10.
Agrawal, et al., "On Integrating Catalogs", Retrieved at <<http://citeseerx.ist.psu.edu/viewdoc/download?doi=10.1.1.20.9616&rep=rep1&type=pdf>>, Hypermedia Track of the 10th International World Wide Web Conference, May 1-5, 2001, pp. 10.
Blum, et al., "Combining Labeled and Unlabeled Data with Co-training", Retrieved at <<http://www.ark.cs.cmu.edu/LS2/images/3/32/BlumMitche1198.pdf>>, The 11th Annual Conference on Computational Learning Theroy, Jul. 24-26, 1998, pp. 10.
Christoudias, et al., "Co-adaptation of Audio-visual Speech and Gesture Classifiers", Retrieved at <<http://people.csail.mit.edu/lmorency/Papers/op153-christoudias.pdf>>, Proceedings of the 8th International Conference on Multimodal Interfaces, ICMI, Nov. 2-4, 2006, pp. 8.
Deng, et al., "Imagenet: A Large-scale Hierarchical Image Database", Retrieved at <<http://ieeexplore.ieee.org/stamp/stamp.jsp?tp=&arnumber=5206848>>, IEEE Conference on Computer Vision and Pattern Recognition, Jun. 20-25, 2009, pp. 248-255.
Everingham, et al., "The Pascal Visual Object Classes Challenge 2010 (VOC2010) Results", Retrieved at <<http://www.pascal-network.org/challenges/VOC/voc2010/workshop/index.html>>, Sep. 11, 2010, pp. 6.
Griffin, et al., "Caltech-256 Object Category Dataset", Retrieved at <<http://authors.library.caltech.edu/7694/1/CNS-TR-2007-001.pdf>>, Technical Report, CNS-TR-2007-001, 2007, pp. 1-20.
Guillaumin, et al., "Multimodal Semi-supervised Learning for Image Classification", Retrieved at <<http://lear.inrialpes.fr/pubs/2010/GVS10/GVS10.pdf>>, The Twenty-Third IEEE Conference on Computer Vision and Pattern Recognition, CVPR, Jun. 13-18, 2010, pp. 8.
Kalva, et al., "Web Image Classification based on the Fusion of Image and Text Classifiers", Retrieved at <<http://ieeexplore.ieee.org/stamp/stamp.jsp?tp=&arnumber=4378772>>, Ninth International Conference on Document Analysis and Recognition, ICDAR, Sep. 23-26, 2007, pp. 5.
Ko, et al., "Pairwise Fusion Matrix for Combining Classifiers", Retrieved at <<http://www.inf.ufpr.br/lesoliveira/download/PR2007.pdf>>, Pattern Recognition, vol. 40, No. 8, Aug. 2007, pp. 2198-2210.
Krogel, et al., "Multi-relational Learning, Text Mining, and Semi-supervised Learning for Functional Genomics", Retrieved at <<http://citeseerx.ist.psu.edu/viewdoc/download?doi=10.1.1.69.4110&rep=rep1&type=pdf>>, Machine Learning, vol. 57, No. 1-2, Oct.-Nov. 2004, pp. 61-81.
Levin, et al., "Unsupervised Improvement of Visual Detectors using Co-training", Retrieved at <<http://ieeexplore.ieee.org/stamp/stamp.jsp?tp=&arnumber=1238406>>, Proceedings of Ninth IEEE International Conference on Computer Vision, Oct. 13-16, 2003, pp. 8.
Li, et al., "Semi-supervised Learning from Different Information Sources", Retrieved at <<http://users.cis.fiu.edu/~taoli/tenure/Li-semi-supervised.pdf>>, Knowledge and Information Systems, vol. 07, No. 3, Mar. 2005, pp. 289-309.
Li, et al., "Landmark Classification in Large-scale Image Collections", Retrieved at <<http://ieeexplore.ieee.org/stamp/stamp.jsp?tp=&arnumber=5459432>>, IEEE 12th International Conference on Computer Vision, ICCV, Sep. 27-Oct. 4, 2009, pp. 1957-1964.
Lin, et al., "News Video Classification Using SVM-based Multimodal Classifiers and Combination Strategies", Retrieved at <<http://citeseer.ist.psu.edu/viewdoc/download;jsessionid=02C4931434B347EA859130EF1FC5A7D3?doi=10.1.1.19.8225&rep=rep1&type=pdf>>, ACM Multimedia, Dec. 1-6, 2002, pp. 4.
Ni, et al., "Epitomic Location Recognition", Retrieved at <<http://ieeexplore.ieee.org/stamp/stamp.jsp?tp=&arnumber=4587585>>, IEEE Transactions on Pattern Analysis and Machine Intelligence, Dec. 2009, pp. 8.
Oliva, et al., "Modeling the Shape of the Scene: A Holistic Representation of the Spatial Envelope", Retrieved at <<http://www.cs.cmu.edu/~efros/courses/LBMV07/Papers/oliva-ijcv-01.pdf>>, International Journal of Computer Vision, vol. 42, No. 3, 2001, pp. 145-175.
Sarawagi, et al., "Cross-training: Learning Probabilistic Mappings between Topics", Retrieved at <<http://www.it.iitb.ac.in/~shantanu/work/scg-kdd03.pdf>>, The Ninth ACM SIGKDD International Conference on Knowledge Discovery and Data Mining, Aug. 24-27, 2003, pp. 10.
Tang, et al., "Co-tracking using Semi-supervised Support Vector Machines", Retrieved at <<http://ieeexplore.ieee.org/stamp/stamp.jsp?tp=&arnumber=4408954>>, IEEE 11th International Conference on Computer Vision, ICCV, Oct. 14-21, 2007, pp. 8.
Wolpert, David H., "Stacked Generalization", Retrieved at <<http://citeseerx.ist.psu.edu/viewdoc/download?doi=10.1.1.56.1533&rep=rep1&type=pdf>>, Neural Networks, vol. 05, 1992, pp. 1-57.
Zhang, et al., "Multimodal Classification of Alzheimer's Disease and Mild Cognitive Impairment", Retrieved at <<http://www.csml.ucl.ac.uk/archive/talks/12dc063a13c729f2f5c98dfe2bb5aaac/paper_8.pdf>>, NeuroImage, 2011, pp. 856-867.
Zhu, et al., "Introduction to Semi-supervised Learning", Retrieved at <<http://pages.cs.wisc.edu/~jerryzhu/hack/ssl.pdf>>, 2009, pp. 142.

* cited by examiner

ACCURATE TEXT CLASSIFICATION THROUGH SELECTIVE USE OF IMAGE DATA

RELATED APPLICATIONS

This application is a continuation of U.S. patent application Ser. No. 13/158,484 entitled "ACCURATE TEXT CLASSIFICATION THROUGH SELECTIVE USE OF IMAGE DATA" filed Jun. 13, 2011, the entire contents of all of which are hereby incorporated by reference for all purposes.

BACKGROUND

It has become common for users of computers connected to the World Wide Web (the "web") to employ web browsers and search engines to locate web pages (or "documents") having specific content of interest to them (the users). A web-based commercial search engine may index tens of billions of web documents maintained by computers all over the world. Users of the computers compose queries, and the search engine identifies documents that match the queries to the extent that such documents include key words from the queries (known as the search results or result set).

Product classification in web-based "commerce search" involves associating categories to products offered by a large number of merchants. The categorized offers are used in many scenarios including product taxonomy browsing and matching merchant offers to products in a catalog-type view. These product offers typically comprise a short textual description of the product plus an image depicting that product. Traditional approaches to classifying such offers are focused on learning a good classifier based on the textual descriptions of the products, and deriving good classifiers—having a high degree of both precision and recall—for each available product is foundational to the provision of a high quality shopping experience.

However, classifiers derived exclusively from textual inputs can sometimes suffer from several shortcomings in the text upon which they rely—namely overlapping text, undescriptive text, and vocabulary usage discrepancies.

SUMMARY

Product images are used in conjunction with the textual descriptions to improve classifications of product offerings. By combining cues from both text and image descriptions associated with products, implementations enhance both the precision and recall of product description classifications within the context of web-based commerce search. Several implementations are directed to improving those areas where text-only approaches are most unreliable. For example, several implementations use image signals to complement text classifiers and improve overall product classification in situations where brief textual product descriptions use vocabulary that overlaps with multiple diverse categories. Other implementations are directed to using text and images "training sets" to improve automated classifiers including text-only classifiers. Certain implementations are also directed to learning a number of three-way image classifiers focused only on "confusing categories" of the text signals to improve upon those specific areas where text-only classification is weakest.

Several implementations are directed to a method comprising inferring a first distribution on a set of training data using a text classifier, inferring a second distribution on the set of training data using an image classifier, and concatenating the first distribution and the second distribution. Several alternate implementations are directed to a method comprising identifying a set of confusion pairs for a first set of training data; training a first plurality of image classifiers on a first set of training data wherein each image classifier corresponds to each confusion pair from among the set of confusion pairs; training a second plurality of image classifiers on the first set of training data wherein each image classifier corresponds to each background category from among a plurality of background categories; inferring a first plurality of distributions for the first plurality of image classifiers on a second set of training data; inferring a second plurality of distributions for the second plurality of image classifiers on the second set of training data; and concatenating each distribution from among the first plurality of distributions with a corresponding distribution from among the second plurality of distributions together with a third distribution produced by a text classifier.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
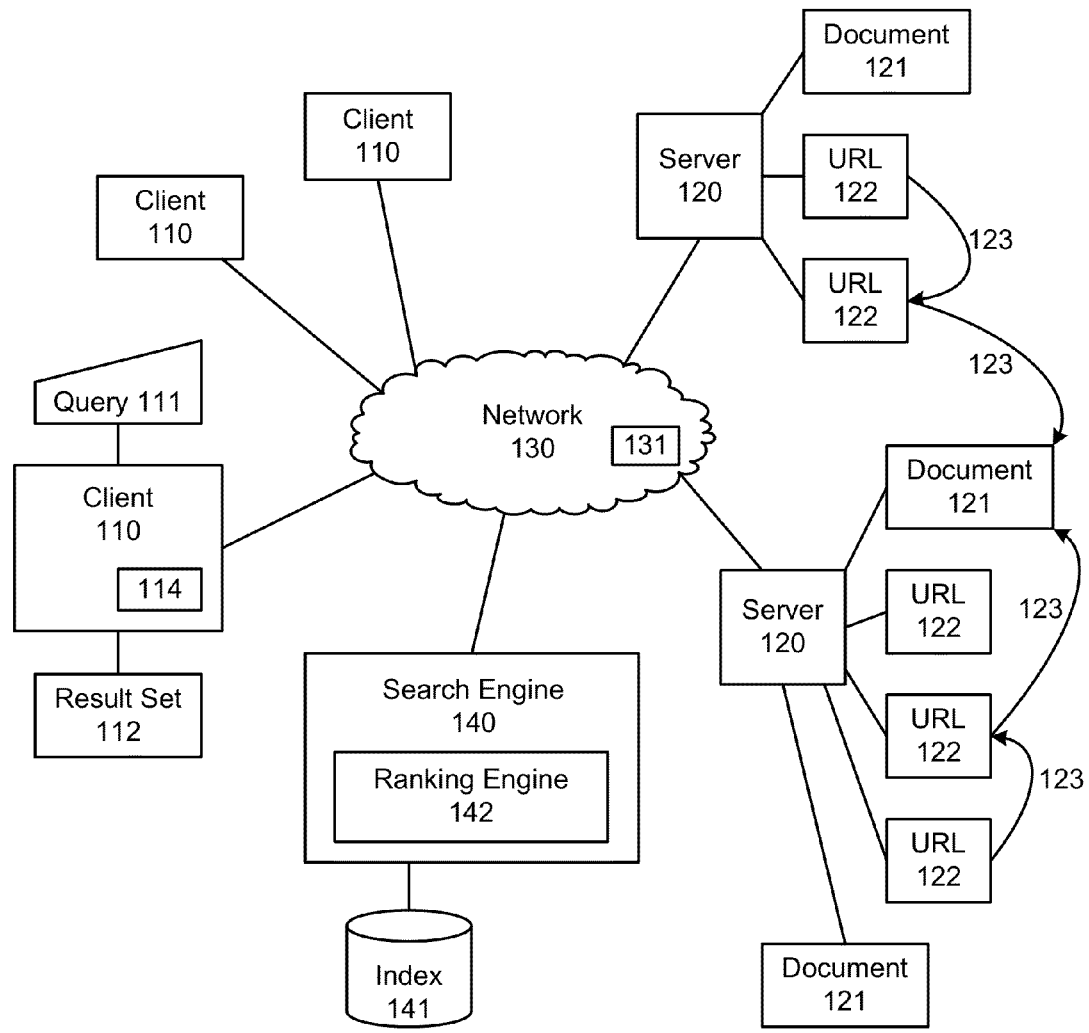
FIG. 1 is an illustration of a search engine in an exemplary network environment in which the numerous implementations disclosed herein may be utilized.

FIG. 1 is an illustration of a search engine 140 in an exemplary network environment 100 in which the numerous implementations disclosed herein may be utilized. The environment 100 includes one or more client computers 110 and one or more server computers 120 (generally "hosts") connected to each other by a network 130, for example, the Internet, a wide area network (WAN), or a local area network (LAN). The network 130 provides access to services such as the World Wide Web (the "web") 131. An example computing device is described with respect to FIG. 5.

The web 131 allows the client computers 110 to access documents 121 containing text or multimedia and maintained and served by the server computers 120. Typically, this is done with a web browser application program 114 executing on the client computers 110. The location of each of the documents 121 may be indicated by an associated uniform resource locator (URL) 122 that is entered into the web browser application program 114 to access the document (and thus the document and the URL for that document may be used interchangeably herein without loss of generality). Many of the documents may include hyperlinks 123 to other documents 121 (with each hyperlink in the form of a URL to its corresponding document).

In order to help users locate content of interest, a search engine 140 may maintain an index 141 of documents in a memory, for example, disk storage, random access memory (RAM), or a database. In response to a query 111, the search engine 140 returns a result set 112 that satisfies the terms (e.g., the keywords) of the query 111. To provide a high-quality user experience, search engines order search results using a ranking function that, based on the query 111 and for each document in the search result set 112, produces a score indicating how well the document matches the query 111. The ranking process may be implemented as part of a ranking engine 142 within the search engine 140.

With regard to web-based commerce, online shopping sites (such as those offered by major search engine providers) target a rich and diverse set of products, and foundational to their success is to provide users with the ability to browse products offerings organized according to the product taxonomy of search engines—and thus automatic classification of product offers under such a taxonomy is widely utilized.

Figure 2:
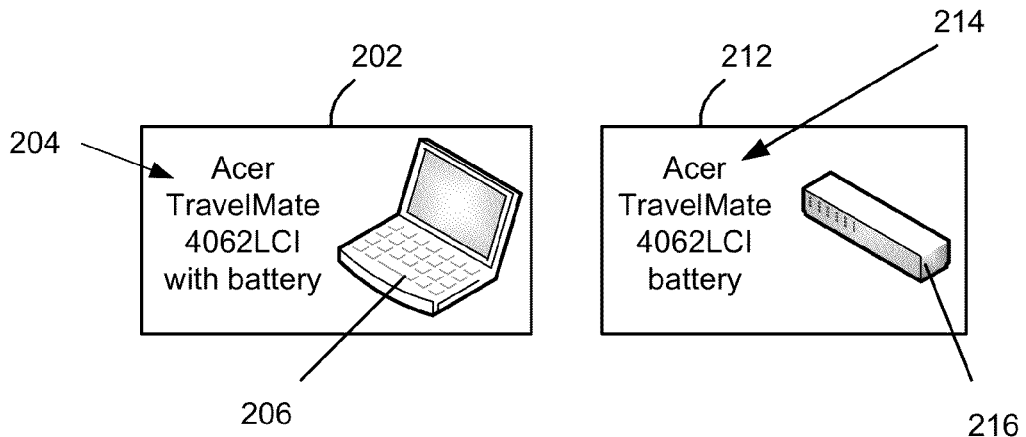
FIG. 2 is an illustration of two exemplary product offerings as they might be presented to a potential customer via the search engine of FIG. 1.

FIG. 2 is an illustration of two exemplary product offerings 202 and 212 as they might be presented to a potential customer via the search engine 140 of FIG. 1. The first product offering 202 pertains to a laptop and is presented in both text 204 and an image 206. The second product offering 212 pertains to a battery and is also presented in both text 214 and an image 216.

While existing approaches to product classification rely purely on the textual description of the products, these text-only based classifiers face several challenges. For example, many categories in a taxonomy may have products that are interrelated, and thus the textual descriptions of their products may overlap in vocabulary usage. Thus, perfectly valid textual descriptions for two completely different products—such as a laptop ("Acer TravelMate 4062LCl with battery") and a battery ("Acer TravelMate 4062LCl battery") shown in FIG. 2—might pertain to entirely different searches (from a consumer's perspective) and yet differ in just one word (and even a taxonomically irrelevant word as in this case).

Another challenge to good text-based classification is the prevalence of short, undescriptive text for a product offering. While product offers typically come from merchants seeking referrals from the online shopping websites, these websites typically have little or no control over the product description provided by the merchants and, in many cases the descriptions provided by the merchants are brief or incomplete. In some instances, a product description from a merchant may just include a model number such as "P43A" which, if the automated classifier is unaware of this model number, is insufficient to correctly classify the product.

Yet another challenge inherent to text-based classification stems from discrepancies (or variations) in vocabulary usage. While product classifiers in the e-commerce search setting may be trained using labeled data prepared by a small pool of human labelers, the product offers needing classification may come from a very large number (e.g., thousands) of ever-changing merchants who may differ in their vocabulary and style in describing the products they offer. Therefore, given the enormity of the taxonomy, effectively capturing all variations in the product descriptions using reasonable amounts of human-derived training data is unlikely. Consequently, there will often be mismatches between the vocabulary used to train a classifier and the vocabulary used in the offers to be categorized by the learned classifier. This may be particularly true for new emerging products where the vocabulary around the product is emerging as well.

As shown in FIG. 2, almost all products in an e-commerce site have an associated image of the product in addition to text—which is not surprising since merchants have long realized that users shop visually and are more attracted to products they can see for themselves. It is these images that can be used to provide additional clues that, when used in conjunction with the available text, are able to improve the classification for such products (including products that are often unsuccessfully classified by text-only classifiers). Thus, while the textual descriptions shown in the product offerings in FIG. 2 were nearly the same for the two products 202 and 212 (except for the word "with"), the images are detectably different. Therefore, even if the textual descriptions are uninformative, their associated images contain discernable clues that various implementations herein utilize to form better classifiers.

To this end, various implementations disclosed herein are directed to combining classifiers (text and image) to improve classification. Certain such implementations use combined classifiers for a subset of categories in which the text classifiers are ineffective (and thus can be referred to as "confusion driven" classifiers). These implementations may utilize a set of labeled instances, comprising both text and image features, and a base classifier that provides probabilistic predictions over categories.

For several implementations, combining varied feature sets in some common subspace shared by the feature sets may be used to provide more robustness to the combination. In other words, separate classifiers that are trained independently for each feature set can be used to provide more robust classifications when the outputs from these independent classifiers (in the same feature space of probability in predictions) are then combined for the next higher level of abstraction. This process is referred to herein as "probabilistic fusion" (PF).

Figure 3:
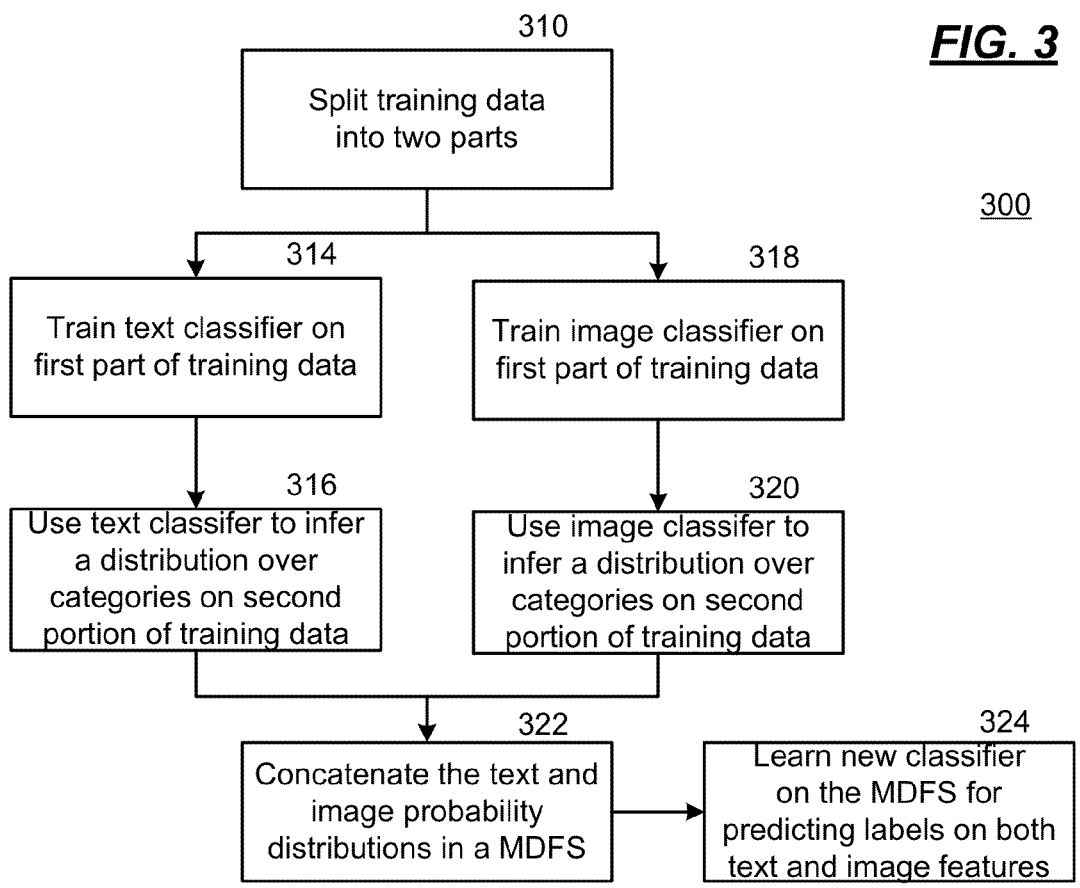
FIG. 3 is a process flow diagram for an exemplary method of probabilistic fusion (PF) utilized by several implementations disclosed herein.

FIG. 3 is a process flow diagram for an exemplary method 300 of PF utilized by several implementations disclosed herein. Referring to FIG. 3, the method 300 begins at 310 by splitting a collection of training data into two parts (a first portion and a second portion). At 314, a text classifier is trained on the text features using the instances comprising the first portion of the training data. Then, at 316 infer for each instance in the second portion of the training data a distribution over the categories using the text classifier trained in 314.

Separately, at 318, an image classifier is similarly trained on the image features using the instances in the first portion, and then at 320 infer for each instance in the second portion of the training data a distribution over the categories using the image classifier trained in 318. It should be noted that the training (314 and 318) and inference (316 and 320) operations may be conducted in serial staring with either the text (314 and 316) or image (318 and 320) operations, or these training operation threads may be conducted in parallel as shown in FIG. 3.

At 322, the two probability distributions (for the text and for the image) are concatenated to create a multi-dimensional feature vector of probabilities (i.e., a new multi-dimensional feature set, or MDFS) with portions that effectively capture the uncertainty in category prediction for the text and image classifiers, respectively. Then, at 324, another classifier is learned using this multi-dimensional feature set where this third classifier learns the relative importance in the probabilistic prediction of the two base classifiers trained separately on text and image features—and thus this third classifier (constituting a "single large multi-way classifier") effectively learns to predict labels using both types of features (text and image).

While combined text-and-image classifiers can provide relatively good classifications in all instances, a text-based classifier does provide reasonably good performance in most instances, and in those instances the need for a combined text-and-image classifier may be de minimis. For this reason, several implementations may be directed to the use of a combined text-and-image classifier for only those specific instances where a text classifier is inadequate. In other words, since images play a beneficial role in only those categories where the text-based classifier gets "confused," it may be sufficient to systematically leverage image signals for only these categories. This high-value variation of probabilistic fusion (PF) is hence referred to herein as "confusion-driven probabilistic fusion" (CDPF).

Figure 4:
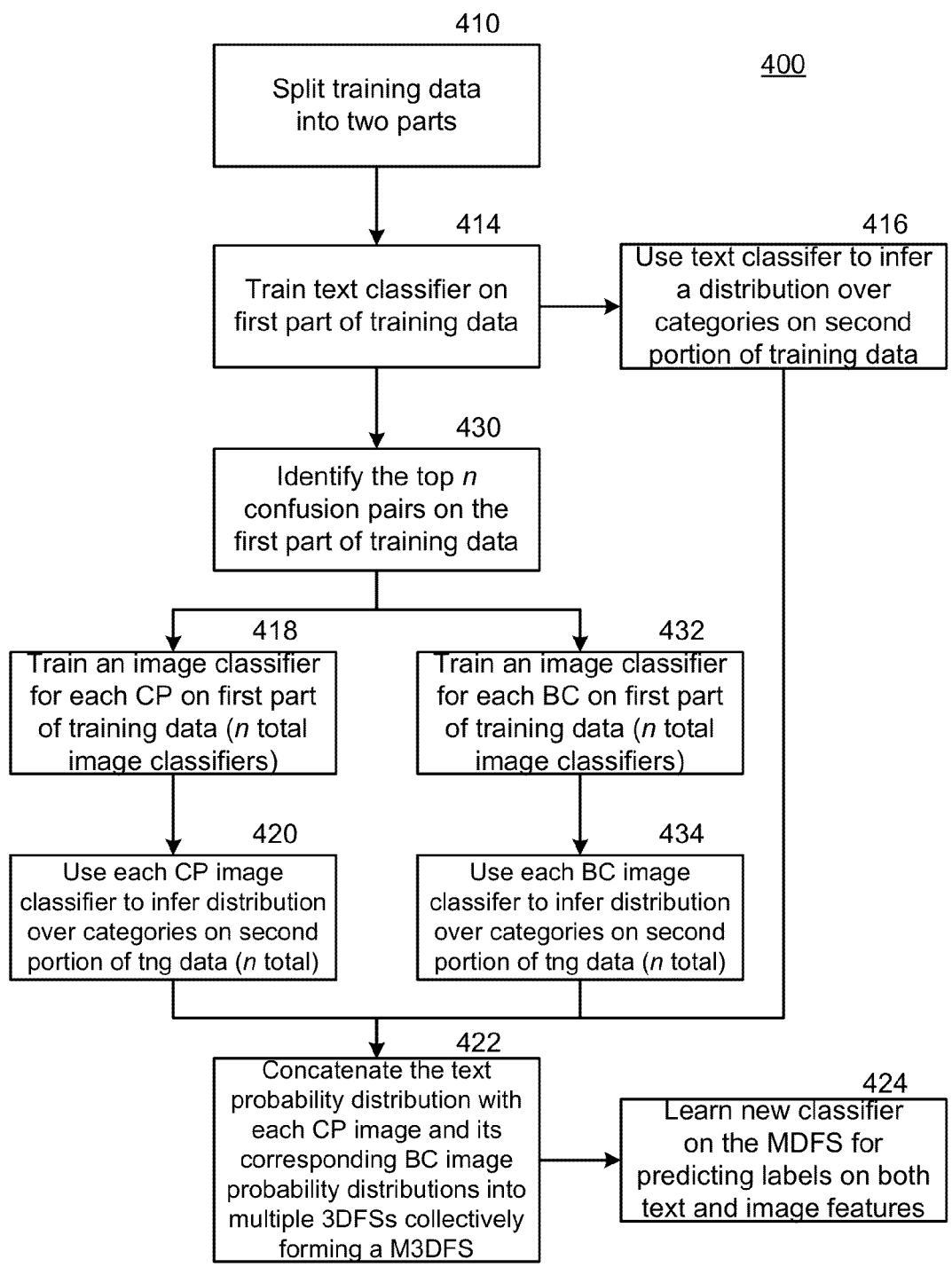
FIG. 4 is a process flow diagram for an exemplary method of confusion driven probabilistic fusion (CDPF) utilized by several implementations disclosed herein.

FIG. 4 is a process flow diagram for an exemplary method 400 of CDPF utilized by several other implementations disclosed herein. Referring to FIG. 4, the method 400 begins at 410 by splitting a collection of training data into two parts (a first portion and a second portion). At 414, a text classifier is trained on the text features using the instances comprising the first portion of the training data. Then, at 416, an inference is made for each instance in the second portion of the training data a distribution over the categories using the text classifier trained in 414.

Separately, at 430, the top n confusing pairs of categories for a classifier are identified again using the first portion of the training data and again using the text classifier trained at 414. Then, at 418, the system learns a separate image classifier for each pair of confusing pairs (CPs) from among the n confusing pairs (i.e., learn n confusing pair image classifiers). At 420, each image classifier is then used to infer, for an instance corresponding to its confusing pair in the second portion of the training data, a distribution over the categories (a total of n times). In addition, a plurality of "background categories" (BC) consisting of all categories other than the pair already under consideration, are learned at 432 (i.e., learn n background category image classifiers) and distributed at 434 (a total of n times) to form separate third classifiers in order to account for the possibility that the true class of classifiers might be different from the categories in the confusing pairs. It should be noted that, similar to FIG. 3, parallel operations of FIG. 4 may be executed serially in varying order as well as in parallel as illustrated. Moreover, various implementations disclosed herein, including those illustrated in FIGS. 3 and 4, might be implemented by combining two signals from sources other than text and images such as from, for example, waveforms and textual transcripts, and such alternative implementations are explicitly anticipated by the disclosures made herein.

At 422, the method 400 concatenates the text probabilities distribution with each confusion pair image probability distribution and its corresponding background category image probability distribution to create multiple three-dimensional feature vectors of probabilities (i.e., multiple new three-dimensional feature sets, or 3DFSs) collectively forming a multi-3D feature set having portions that effectively capture the uncertainty in category prediction for the text and image classifiers, respectively. Then, at 424, another classifier uses this multi-3D feature set to learn the relative importance in the probabilistic prediction of the multiple classifiers trained separately on text/confusion pair/background categories features—and thus this third classifier effectively learns to predict labels with special regard to confusing pairs.

For certain implementations disclosed herein, unlabeled data in the form of merchant offerings may be used to improve the supervised classifiers trained using the techniques described above. For example, some implementations may use the semi-supervised learning strategy known as "self training" to exploit unlabeled data. As will be appreciated by a skilled artisan, self training works in iterations where an existing classifier is used to automatically label unlabeled data, and then instances classified as high confidence are added back to the labeled data to train the classifier in the next iteration. Thus, such implementations—both as the self-trained versions of the probabilistic fusion (PF++) classifier and the confusion driven probabilistic fusion (CDPF++) classifier—allow the label of an automatically labeled instance to change in subsequent iterations in order to make recovery from a misclassification possible. In addition, some implementations may also use a self-trained version of the text classifier in order to evaluate whether large amounts of text-only unlabeled data make the image signal irrelevant. Alternatively, other implementation may use co-training algorithms known to skilled artisans and shown to work for a variety of multi-view problems in computer vision and other domains. Co-training is used to learn separate classifiers, infer labels for the unlabeled examples, and then add these examples to training sets used to retrain the classifiers. In addition, the text and images "training sets" disclosed herein for PF and CDPF can be used to improve automated classifiers including text-only classifiers as well as text-and-image classifiers. For example, at block 324 of FIG. 3 or block 424 of FIG. 4, such an implementation might instead "learn new classifier on the MDFS for predicting labels on text features only", for example (respectively). Such approaches might be useful when images are not available, to avoid the expense of image feature extraction, or to improve efficiency or latency or both, for example.

Visual features may comprise global image features that capture the global image structure in a low dimensional space. As such, the global features may be computed for each image as follows: (1) responses of steerable pyramid filters tuned to 6 different orientations and 5 scales are computed; (2) each image is divided into 4×4 local grids; and (3) the mean value of the magnitude of these local features is averaged over those grids. This approach enables the capture of global image properties while maintaining only a limited amount of spatial information. The resulting 4×4×30 vector may then be used as a visual feature representation of the image for the various implementations disclosed herein.

Figure 5:
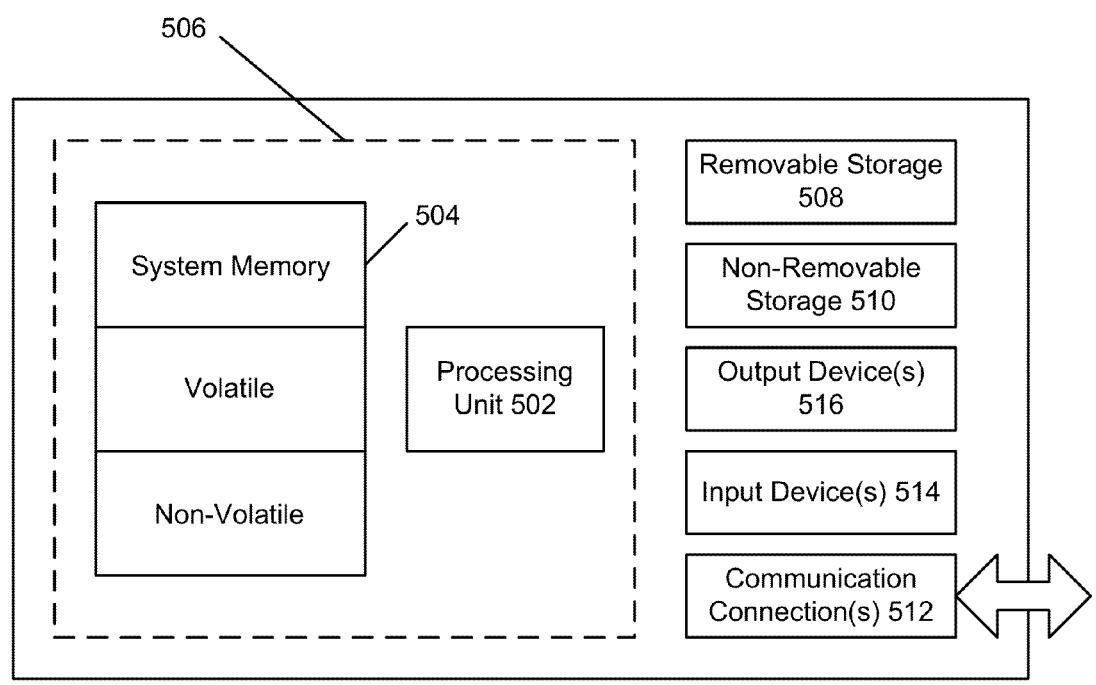
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for classifying search results by a search engine comprising an index of documents in a memory corresponding to a plurality of products offered by a plurality of online shopping sites and comprising text classifiers and image classifiers, a user interface enabling for enabling a user to browse products offerings organized according to the product taxonomy and receiving a search query from the user and providing the user with a set of search results, and a ranking engine for ranking the set of search results to enhance the user's experience, the method comprising:
   inferring a first distribution on a set of training data using a first classifier;
   inferring a second distribution on the set of training data using a second classifier;
   concatenating the first distribution and the second distribution;
   classifying each search result among a set of search results based on the concatenation; and
   ranking the search results based at least in part on the classification.

2. The method of claim 1, wherein the first classifier is a different classifier type than the second classifier.

3. The method of claim 2, wherein the first classifier is a text-type classifier and the second classifier is an image-type classifier.

4. The method of claim 1, further comprising splitting the set of training data into a first subset of training data and a second subset of training data, wherein the first distribution is inferred on the first subset of training data and the second distribution is inferred on the second subset of training data.

5. The method of claim 1, wherein search results are the result of a user-based shopping query.

6. The method of claim 1, wherein the classification results in each search result having a score that is then used in the ranking.

7. The method of claim 1, wherein each search result corresponds to a product offered by an online shopping site.

8. The method of claim 7, further comprising organizing the ranked search results according to a product taxonomy of the search engine.

9. The method of claim 1, further comprising:
   determining that classifying the search results will not be beneficial; and
   disregarding the ranking based on the classification.

10. The method of claim 1, further comprising:
    updating at least one of the first distribution or the second distribution; and
    re-concatenating the first distribution and the second distribution for use in subsequent classifying and ranking operations.

11. An online shopping system comprising:
- an index of documents;
- a search engine for receiving a query and returning a set of search results responsive to the query based on the index of documents; and
- a ranking engine for ranking the search results based at least in part on a classification based on the concatenation of a first distribution and a second distribution, wherein the first distribution and the second distribution result from inferences on different sets of training data using different classifiers.

12. The system of claim 11, wherein the search engine comprises a first classifier and a second classifier, wherein the first classifier infers the first distribution and the second classifier infers the second distribution.

13. The system of claim 12, wherein the first classifier is a text classifier and the second classifier is an image classifier.

14. The system of claim 11, wherein each result among the set of search results corresponds to a product offered by an online shopping site.

15. The system of claim 11, wherein the search engine organizes the ranked search results according to a product taxonomy of the search engine.

16. The system of claim 11, wherein the query is a shopping query.

17. The system of claim 11, wherein the ranking engine is further capable of updating the first distribution and the second distribution and re-concatenating the first distribution and the second distribution.

18. A computer-readable storage device comprising computer readable instructions for classifying each search result from among a set of search results generated by a search engine, the computer readable instructions comprising instructions that:
- train a first classifier on a first set of training data, and infer a first distribution on a second set of training data;
- train a second classifier on the first set of training data, and infer at least one image-based distribution on the second set of training data;
- concatenate the first distribution with the second distribution;
- train a combined classifier based on the concatenation;
- classify each result from among a set of search results generated by the search engine; and
- rank the set of search results based at least in part on the classification.

19. The computer-readable storage device of claim 18, further comprising instructions that:
- prior to classifying, receive a search query from a user;
- after ranking, returning the set of search results to the user.

20. The computer-readable storage device of claim 19, further comprising instructions that, after ranking the set of search results but before returning the set of search to the user, organizes the set of search results according to a product taxonomy of the search engine.

* * * * *